US007036761B2

(12) United States Patent
Washington et al.

(10) Patent No.: US 7,036,761 B2
(45) Date of Patent: May 2, 2006

(54) DUAL REEL UNWINDER/REWINDER WITH A SLACK TAKE-UP MECHANISM

(75) Inventors: Glen Washington, Reno, NV (US); David Lloyd, Crystal Lake, IL (US)

(73) Assignee: PRFC, Inc., Reno, NV (US)

( * ) Notice: Subject to any disclaimer, the term of this patent is extended or adjusted under 35 U.S.C. 154(b) by 0 days.

(21) Appl. No.: 10/248,945

(22) Filed: Mar. 4, 2003

(65) Prior Publication Data

US 2004/0173709 A1    Sep. 9, 2004

(51) Int. Cl.
*B65H 20/32*    (2006.01)

(52) U.S. Cl. ............................... 242/417.2; 242/417.3; 191/12.2 R (58) Field of Classification Search ............. 242/417.3, 242/388.6, 417.2; 191/12.2 R, 12.2 A
See application file for complete search history.

(56) References Cited

U.S. PATENT DOCUMENTS

| 1,276,825 A | 8/1918 | Swope |
| 3,657,491 A | 4/1972 | Ryder ................ 191/12.2 R |
| 3,700,834 A | 10/1972 | Schaefer ............... 191/12.2 R |
| 3,821,496 A | 6/1974 | Malone ................ 191/12.2 R |
| 3,834,645 A | 9/1974 | Morishige ............... 242/107.7 |
| 3,912,191 A * | 10/1975 | Anderson et al. ........ 242/421.8 |
| 4,499,341 A | 2/1985 | Boyd ........................ 191/12.4 |
| 4,713,497 A | 12/1987 | Smith ................... 191/12.2 R |
| 4,946,010 A | 8/1990 | DiBono ................ 191/12.2 R |
| 5,094,396 A | 3/1992 | Burke ..................... 242/107.1 |
| 5,168,969 A | 12/1992 | Mayhew ............... 191/12.2 R |
| 5,518,417 A | 5/1996 | Liu ............................ 439/501 |
| 5,526,997 A | 6/1996 | Karczmer ............... 242/388.5 |
| 5,791,580 A | 8/1998 | Anderson ............... 242/378.4 |
| 5,913,487 A | 6/1999 | Leatherman ............. 242/378.4 |
| 6,250,578 B1 | 6/2001 | Manda .................... 242/378.1 |
| 2002/0023814 A1 | 2/2002 | Poutiatine ............. 191/12.2 R |

* cited by examiner

*Primary Examiner*—John Q. Nguyen
(74) *Attorney, Agent, or Firm*—Law Offices of Howard L. Hoffenberg, Esq.,; Howard Hoffenberg, Esq.

(57) ABSTRACT

A cable unwinder/rewinder with continuous electrical connection which is suitable for use with heavy gauge cable and in a pharmaceutical manufacturing environment. A general embodiment is comprised of a frame; a user-side reel; a slack-side reel and a slack take-up mechanism. Exemplary embodiments of the slack take-up mechanism are a power pivotal arm, a spring loaded arm, a extension spring assembly, a compression spring assembly and a dual real assembly.

10 Claims, 13 Drawing Sheets

DUAL REEL UNWINDER/REWINDER WITH A SLACK TAKE-UP MECHANISM

BACKGROUND OF THE INVENTION

1. Field of the Invention

The present invention relates to the field of cable unwinders and rewinders, and more particularly to unwinders and rewinders having a dual reel configuration that provide a continuous electrical connection.

2. Related Art

The Government of the United States of America requires validation of pharmaceutical manufacturing facilities and that such facilities adhere to current good manufacturing practices (see, The Food, Drug and Cosmetic Act and Part 21 of the Code of Federal Regulations.) Besides the Government of the United States of America, governments of the European Union and other parts of the world impose similar requirements for the validation of pharmaceutical manufacturing facilities. There are companies such as PRFC, Inc., (Reno, Nev.) that assist pharmaceutical manufacturers with this validation.

The requirements for validation includes validating the efficacy of autoclaves. An autoclave is a sterilizer that has a heated chamber. In a typical set-up to validate an autoclave, a plurality of heat sensors, known as thermocouples, are positioned at various locations within the chamber of the autoclave. There is usually between about 15 to about 25 thermocouples that are positioned within the autoclave.

Each of these thermocouples that are positioned within the autoclave is connected via a separate thermocouple wire to a data logger/recorder. Normally, the thermocouple wire that is used is a heavy gauge cable. It has iron and copper strands which are encapsulated in insulation. The cable is approximately about 8 to about 12 gauge for a wire pair. Its physical properties are qualitatively described as thick, resilient and unruly. The data logger/recorder may be located up to 25 feet from the autoclave.

Thus, when validating an autoclave, there are about 15 to about 25 long thermocouple wires running between the autoclave and data logger/recorder that are unruly and untidy. The thermocouple wires often become entangled, twisted and disorganized. This can damage the thermocouple wire and make it difficult to position and disengage the data logger/recorder from the autoclave. Further, it is difficult to trace a thermocouple wire from the interconnected between the data logger/recorder to the autoclave. Being able to trace is critical to properly placing the wire and thermocouple in the autoclave chamber.

There is an art that teaches the design of unwinders/rewinders. One genre of unwinders/rewinders is for wires that provide power to alternating current devices such as such as power tools. These unwinders/rewinders employ brushes or slip rings to make a discontinuous electrical connection. Brushes and slip rings are suitable for providing alternating current for power tools; but, the discontinues nature of the connection is a source of undesirable electrical noise in the context of analytical equipment; e.g., voltage and current bounces and spikes.

Another genre of unwinders/rewinders employ mercury contacts for a continuous electrical connection. Mercury contacts are suitable for audio connections and test equipment in a non-food and non-drug environment. For obvious reasons, a toxic substance like mercury is undesirable and/or not suitable in the food and drug environment.

Another genre of unwinders/rewinders employ a dual reel system for continuous electrical connection. One such device is described in U.S. Pat. No. 1,276,825, issued on Aug. 27, 1918, to D. Swope, and incorporated herein by reference. The patent teaches dual reels disposed on axle within a housing. One of the reels is a user-side reel and the other reel is a slack-side reel. The slack-side reel has an inside diameter less than the inside diameter of the user-side reel. A loaded coil spring is superimposed on the reel axle to provide a rewind force. As cable is wound from the user-side reel, cable is simultaneously unwound unto a slack-side reel. The relatively smaller inside diameter of the slack-side reel results in a shorter length of cable winding/unwinding on the slack-side reel than that being unwound/wound on the user side reel.

This device has the drawback that the cable being unwound on the slack-side reel has nowhere to go but to pile up in a housing. Accordingly, the cable is subject to tangling, twisting, knotting and kinking, all of which impede the operation of the unwinder/rewinder. Further, if the device were fitted with heavy gauge cable, the heavy gauge cable which is stiff would resist piling up in the housing and thereby generate a back pressure retarding unwinding/winding. The device has the further drawback of insufficient force to rewind a heavy gauge cable, or in the alternative, requires a coil spring with such a great spring constant that unwinding requires cumbersome force and strains the mounting system.

U.S. Pat. No. 4,646,987, issued on Mar. 3, 1987 to E. Peterson, teaches a dual reel unwinder/rewinder for a telephone headset wire and is incorporated by reference. This device is designed for flat cable. A flat cable is thin tape that is soft, flexible and pliable. The device does not accommodate a heavy gauge cable which is relatively large, thick and stiff. The device has the disadvantage of utilizing two reels that are the same size which results in an equal length of flat cable unwinding on both reels during operation. Unwinding a equal length of cable on both sides wastes cable. The device has the additional disadvantage that the unwinder/rewinder travels as flat cable is wound and unwound. A still further disadvantage of this device is that the rewind mechanism is not strong enough to rewind heavy gauge cable, assuming the device could be fitted with heavy gauge cable.

Accordingly, there is a need for winder/unwinder that is suitable for use with scientific equipment (i.e., provides for an uninterrupted and continuous transmissions of a signal with low noise); suitable for use in the pharmaceutical manufacturing environment (e.g., does not contain toxic materials); accommodates heavy gauge cable; accommodates long lengths of cable; has an automatic rewind function; does not waste expensive cable; does not result in tangling, twisting, knotting and kinking of heavy gauge cable and remains stationary during operation.

The present invention satisfies these needs, as well as others, and generally overcomes the presently known deficiencies in the art.

SUMMARY OF INVENTION

The present invention is directed to devices that are both a cable unwinder and rewinder.

An objective of the present invention is a cable unwinder/rewinder that is suitable for heavy gauge cable.

A further objective of the present invention is a cable unwinder/rewinder with no interruptions in the transmission of signals; i.e., a continuous transmission and low noise.

A further objective of the present invention is a cable unwinder/rewinder that is suitable for use in pharmaceutical manufacturing environment.

A further objective of the invention is a cable unwinder/rewinder that is capable of winding and unwinding lengths of heavy gauge that are up to 25 feet long.

A further objective of the present invention is a cable unwinder/rewinder that retards tangling, twisting, kinking and knotting of heavy gauge cable.

A further objective of the present invention is a cable unwinder/rewinder that has automatic rewind.

A further objective of the present invention is a cable unwinder/rewinder that is tolerant towards jerks, accelerations and decelerations.

A further objective of the present invention is a cable unwinder/rewinder that is stationary and minimizes the amount of unusable cable.

A further objective of the present invention is a cable unwinder/rewinder which can be used in a configuration to service numerous cables and/or can be configured in a plurality to service numerous cables.

An exemplary embodiment of the invention has four major components; namely, a frame, a user-side reel, a slack-side reel and a slack take-up mechanism. The user-side reel and slack-side reel are rotatably mounted to the frame and linked to rotate together. Exemplary embodiments of the slack take-up mechanism are a power pivotal arm, an extension spring assembly, a compression spring assembly and a dual real assembly. One aspect of the power pivotal arm is a spring loaded arm. The slack take-up mechanism is in proximity to the frame.

A heavy gauge cable is threaded between the user-side reel and the slack-side reel. The heavy gauge cable is coiled in one direction on the user-side reel and in the opposite direction on slack-side reel. The heavy gauge cable coming off the slack-side reel is threaded around or through the slack take-up mechanism and then secured.

A user unwinds a length of heavy gauge cable off the user-side reel. At the same time, the slack-side reel rotates and winds up heavy gauge cable which is withdrawn from the slack take-up mechanism. When the user seeks to rewind heavy gauge cable onto the user-side reel, the user actuates the slack take-up mechanism to provide a driving force for rewind. During rewind, the slack-side reel rotates so as to unwind cable off of itself. The unwinding cable is taken up by the slack take-up mechanism.

In an embodiment of the present invention, the hub diameter of the user-side reel is greater than the hub diameter of the slack-side reel. In another embodiment of the present invention, there is one or more wire guides mounted at the periphery of reels to direct the winding and unwinding of heavy gauge cable on or off a reel. In another embodiment of the present invention, there are one or more fenders configured in proximity to a reel to retain the heavy gauge cable within the reel.

The unwinder/rewinder of the present invention has many advantages over devices in the prior art. These advantages include suitability for heavy gauge cable, suitability for the pharmaceutical manufacturing environment, automatic rewind, freedom from toxic materials, inhibition of jamming/tangling of cable and a continuous low-noise electrical connection.

BRIEF DESCRIPTION OF DRAWINGS

These and other features, aspects and advantages of the present invention will become better understood with reference to the following drawings where:

FIG. 4a shows an exploded front view of several of the structures that make up an embodiment of the present invention; FIG. 4b shows a front view of several of the structures that make up an embodiment of the present invention from FIG. 4a;

DETAILED DESCRIPTION

The present invention is intended for use with heavy gauge cable, especially, thermocouple wire. Heavy gauge cable typically is between about 8 to about 12 gauge and may be a lower gauge. Notwithstanding, the present invention is in no manner limited to heavy gauge cable. That is the present invention is utilizable with thin, flexible, flat, low gauge and other configurations of cable. Heavy gauge cable includes these others other gauge and style cables. Heavy gauge cable also includes a plurality of cables bundled together.

Overview

Figure 1:
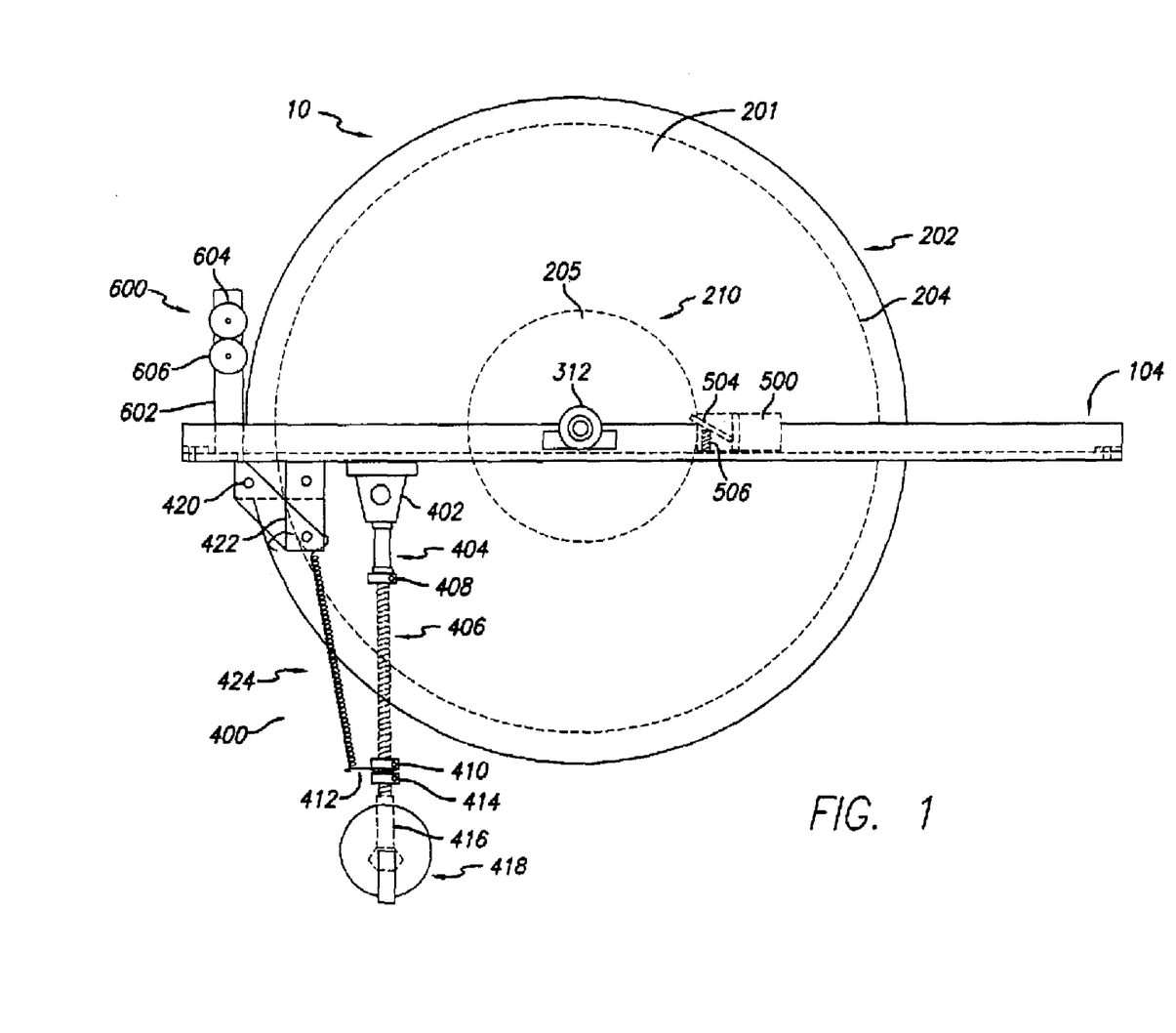
FIG. 1 shows a side view of an embodiment of the heavy gauge cable unwinder/rewinder according the present invention illustrating, inter alia, a frame member, two reels, a spring-loaded arm, ratchet and a wire guide.
Figure 2:
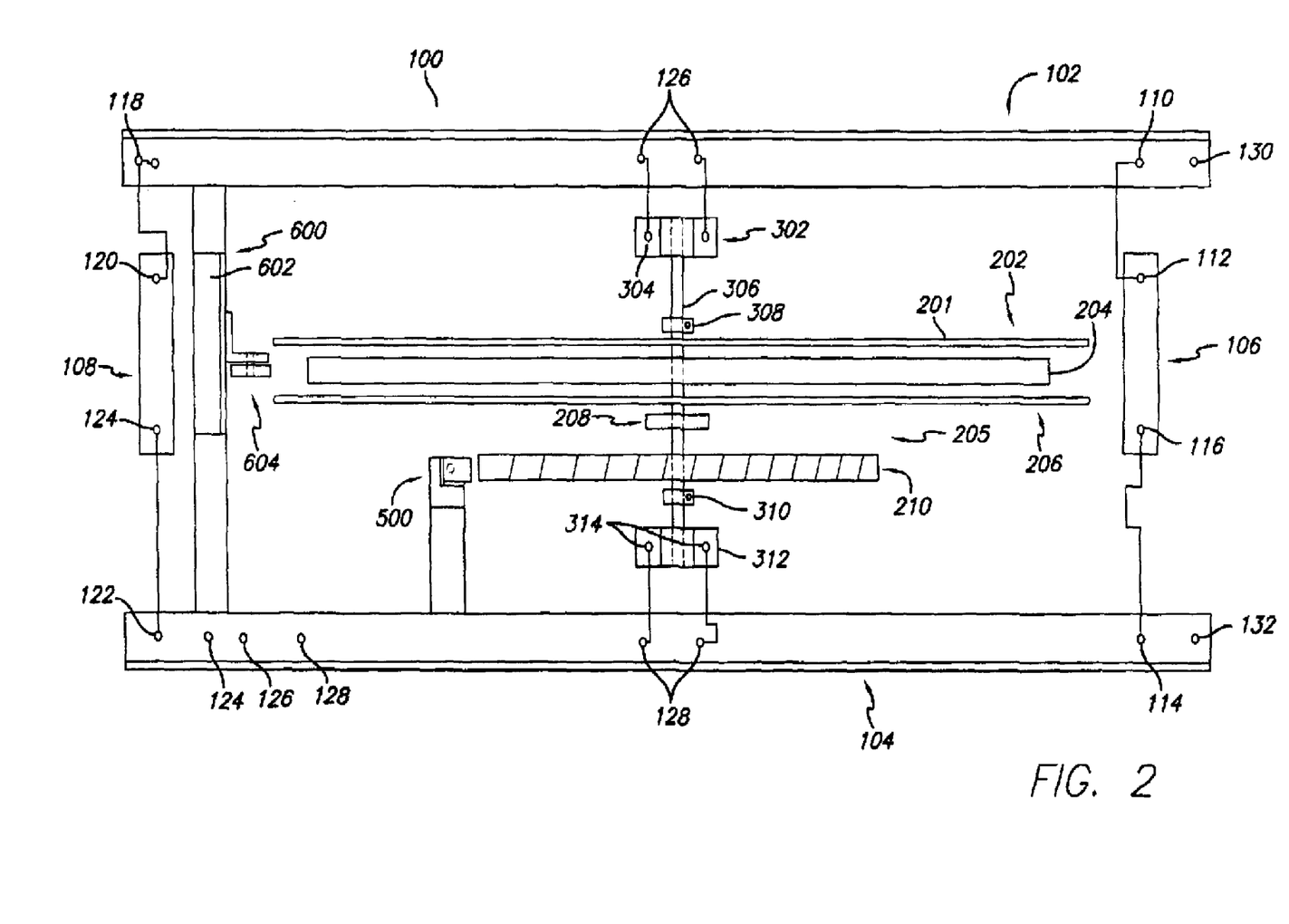
FIG. 2 shows a top view of several of the structures that make up an embodiment of the heavy gauge cable unwinder/rewinder according the present invention.

Referring to FIGS. 1 and 2, the unwinder/rewinder 10 of the present invention is generally comprised of: (a) a frame 100; [b] an axle 306; (c) a user-side reel 201 mounted on the axle; (d) a slack-side reel 205 mounted on the axle and (e) a slack take-up mechanism 400.

Frame Referring to FIG. 2, the frame 100 has a configuration suitable for the mounting and supporting of the other components discussed below. Exemplary configurations of the frame are a rectangle, a pair of cross-members and a housing. A preferred configuration is a rectangular frame comprised of runners 102–108 that are held together with screws fastened into bores 110–122. The frame has additional through bores 124 128 for receiving screws to mount other components to the frame. It also has through bores 130 & 132 for mounting the frame to a cart or manifold. That is, several frames can be mounted in tandem to one cart or manifold. The frame is made out of a material strong enough to support the components. Preferred materials are aluminum and stainless steel and a most preferred material is stainless steel.

User-side Reel

Figure 3:
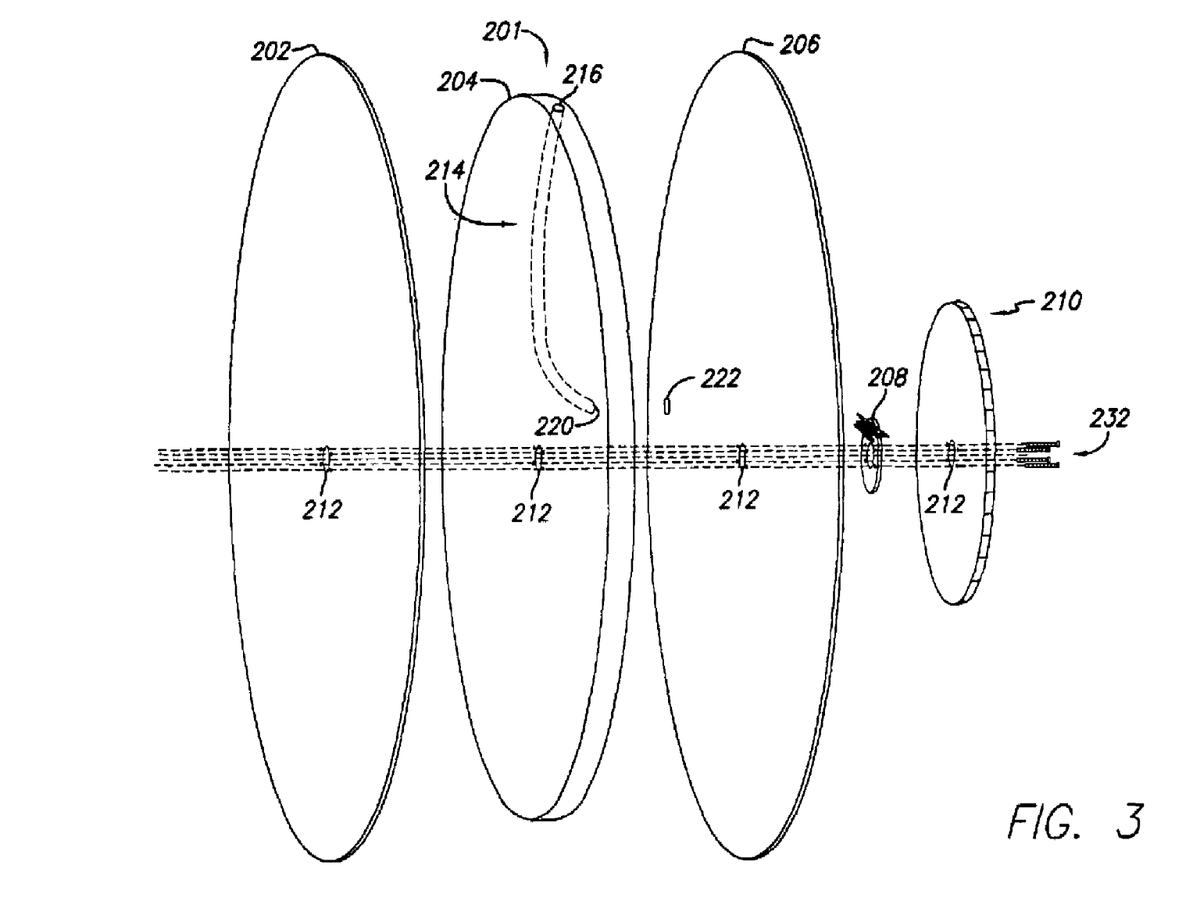
FIG. 3 shows an exploded perspective view of an user-side reel and slack-side reel assembly according to the present invention.
Figures 4A, 4B:
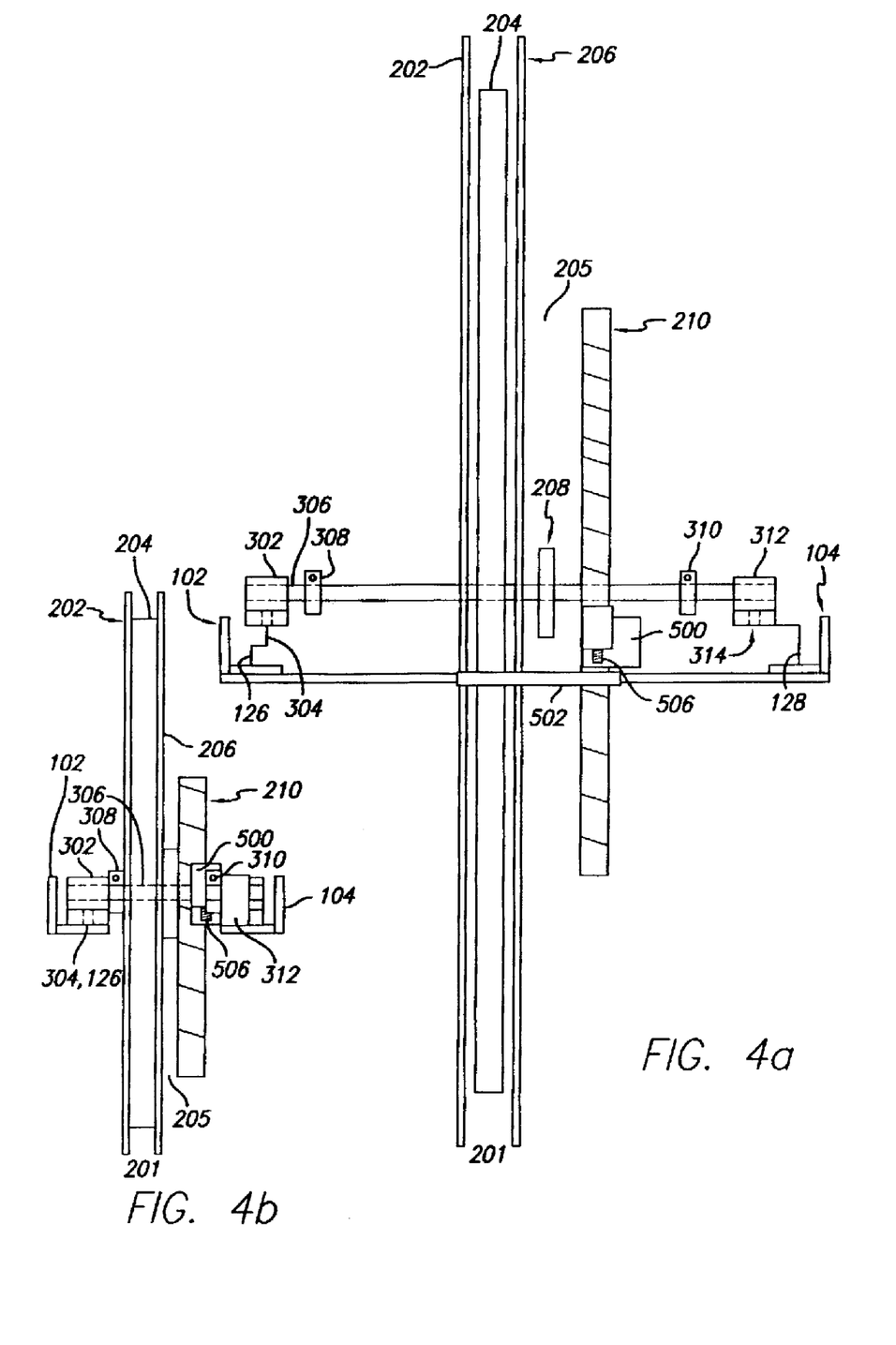

Referring to FIGS. 3 and 4a & 4b, the user-side reel 201 is comprised of a pair of spaced apart sidewalls 202, 206 and a user-side reel hub 204. The sidewalls 202, 206 of the user-side reel are spaced a distance that is at least greater than the diameter of the user-side heavy gauge cable and preferably not more than five diameters. A cavity is defined by the pair of sidewalls 202, 206 and user-side reel hub 204. The cavity is a storage space for the winding of user-side heavy gauge cable. The hub 204 of the user-side reel can be solid or hollow. The minimum practical diameter of the user-side reel hub is about 1.5 inches. Typically, it has a diameter of about 16 inches. There is a throughbore 212 in the center for mounting to an axle. Optionally, the sidewall can be toothed, notched or grooved to engage the pawl of a ratchet.

Continuing to refer to FIG. 3, there is a passage 214 for threading the heavy gauge cable between the user-side reel and the slack-side reel. One end of the passage 216 opens into the cavity of the user-side reel. The other end 220 aligns with a hole 222 in the sidewall facing the slack-side reel which is at a point in line with the perimeter of the hub 208 of the slack-side reel 205.

The user side reel may be constructed out of hard plastics or metals with stainless steel being a preferred material. The components of the user-side reel may be fastened together using screws 232.

Referring to FIGS. 4a & 4b, the user-side reel is rotatably mounted to the frame via an axle assembly. The slack-side reel is preferably mounted to this same axle and thereby linked to rotate with the user-side reel. An exemplary axle assembly is comprised of a pair of pillow blocks 302, 312 mounted to the frame using screws seated in screw holes 126, 128, 304, 314. An axle 306 spans between the pillow blocks with collars 308 & 310 adjacent to the sidewalls of the reels.

Slack-side Reel

Referring to FIGS. 3, 4a & 4b, the slack-side reel 205 is of analogous construction to the user-side reel 201. Namely, there are sidewalls 206 & 210 and a hub 208. In a preferred embodiment, the slack-side reel shares a side-wall 206 with the user-side reel. It is desirable that the diameter of the hub 208 of the user-side reel be as small as functional/practical. Typically, the smallest functional/practical diameter is about 1.5 inches. At any smaller diameter, the heavy gauge cable starts to kink and otherwise does not coil around the hub. The perimeter of the sidewall 210 may be toothed to receive a ratchet. There is an aperture/hole 222 for receiving cable from the user-side reel that is in line with the perimeter of the hub 208. Referring to FIGS. 4a & 4b, the Slack-side reel is mounted on axle assembly 302 314 as described above.

Comparative Size of the Hubs

In a preferred embodiment, the radius of the user-side reel hub 204 is greater than the radius of a slack-side reel hub 208. Such a configuration saves on the length of slack-side cable and provides for a smaller slack take-up mechanism. In a more preferred embodiment, the user side reel hub has a diameter of about 16 inches and the slack-side reel hub has a diameter of about 1.5 inches.

Alternative to an Axle Assembly

A single axle assembly is the preferred manner for mounting the reels to the frame, as described above. When a single axles is used, the reels are fixedly mounted to the axle and the reels are thereby linked to rotate together. The reels may be mounted to the frame on separate axles, on a roller bed, a bearing track, slip rings or by other means known to technicians in the art. The reels a generally in line with each other so that cable can be threaded from one to other with no impairment of rotation due to twisting and coiling of cable during rotation. The reels are linked to rotate together by tie rods, chains & gears and belts & pulleys and other means known to technicians in the art.

Slack Take-up Mechanism

There is a slack take-up mechanism. A slack take-up mechanism is means in proximity to the frame that performs the function of keeping unwinding slack-side cable tout and/or untangled. It also perform the function of providing power for rewind or otherwise facilitating rewinding. Aspects of the slack take-up mechanism are a power pivotal arm, a extension spring assembly, a compression spring assembly and a dual reel assembly. A preferred slack take-up mechanism is a power pivotal arm is a preferred power pivotal arm is spring loaded arm. The slack take-up mechanism is in proximity to the frame and is typically mounted to the frame.

A power pivotal arm has three main components. These components are an arm, a surface for receiving slack-side heavy gauge cable and a power means. The arm is pivotally mounted to the frame. It pivots from a position proximal to the frame to a position distal to the frame. The surface for receiving heavy gauge cable is at about the end of the arm. Typically, the surface is a small guide wheel. The power pivotal arm is positioned on the frame at so that unwinding cable from the slack-side reel can pass across it to a point where the cable is secured to the frame. Typically, the power pivotal arm is positioned a short distance away from the slack-side reel in a manner that allows it to pivot in compliance with gravity during rewind. The power means may be an expansion spring, coil spring, electric motor, hydraulic motor, compressed air motor, weights and other torque generators known to technicians in the art. The power means rotates the arm away from the frame. The power pivotal arm is constructed from plastic, aluminum or stainless steel with stainless steel as a preferred material.

Referring to FIG. 1, a preferred power pivotal arm is a spring-loaded arm. In a spring-loaded arm, there is a pivotally mounted arm assembly. The arm assembly begins with a pillow block 402 mounted to the frame by screws fastened in holes 126 & 128. A clevis pin 404 is inserted into the pillow block 402 and a collar 408 is positioned adjacent to the clevis pin. A shaft 406 is inserted into the clevis pin. A pair of collars 410 and 414 with an S clip 412 between the collars is positioned near the distal of the shaft for receiving a spring 424. A small guide wheel is mounted at the very end of the shaft 416 and 418 and may have a fender.

There is a spring assembly. The spring assembly begins with a mounting bracket 420 attached to the frame by screws fastened in holes 124 & 126. An S clip 422 is secured to the bracket 420. A spring 424 spans from this S clip 422 to the previously mentioned S clip 412 on the arm assembly. The spring 424 biases the arm in an extended position away from the frame.

An alternative embodiment of the spring loaded arm is to have a coil spring superposed around the axle of a pendulum mounted shaft (not illustrated).

Figure 10:
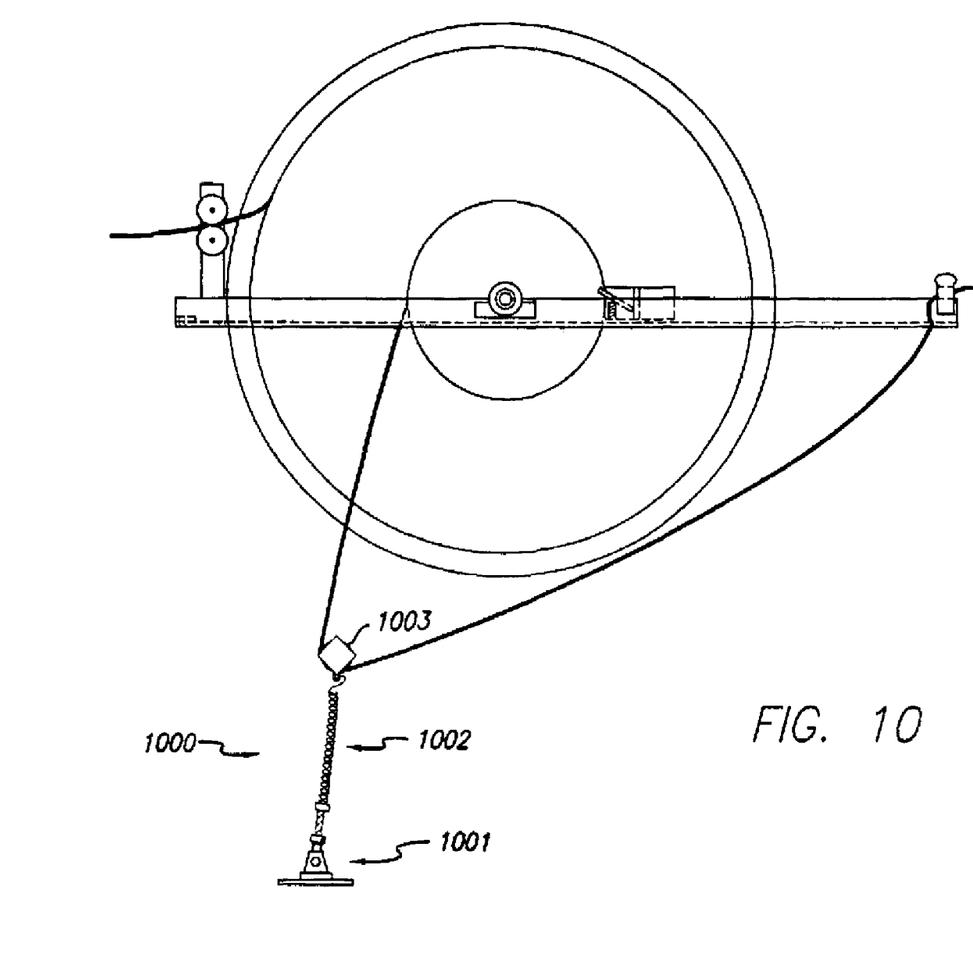
FIG. 10 shows a side view of several of the structures that make up an embodiment of the present invention where the slack take-up mechanism is an extension spring assembly and FIG. 11 shows a side view of several of the structures that make up an embodiment of the present invention where the slack take-up mechanism is a dual reel assembly.

Referring to FIG. 10, an embodiment of the slack take-up mechanism is an extension spring assembly 1000. The assembly begins with a mounting assembly 1001 which may be a pillow block, clevis pin, collars and shaft similar to that described above. An extension spring 1002 secured to the mounting assembly. At the end of the extension spring, there is a surface 1003 for receiving heavy gauge cable which is typically comprised of a small guide roller. The extension spring assembly is spaced away from the slack-side reel at a distance great enough that there is sufficient room for it to expand and contract so as to take up slack-side cable.

Figure 11:
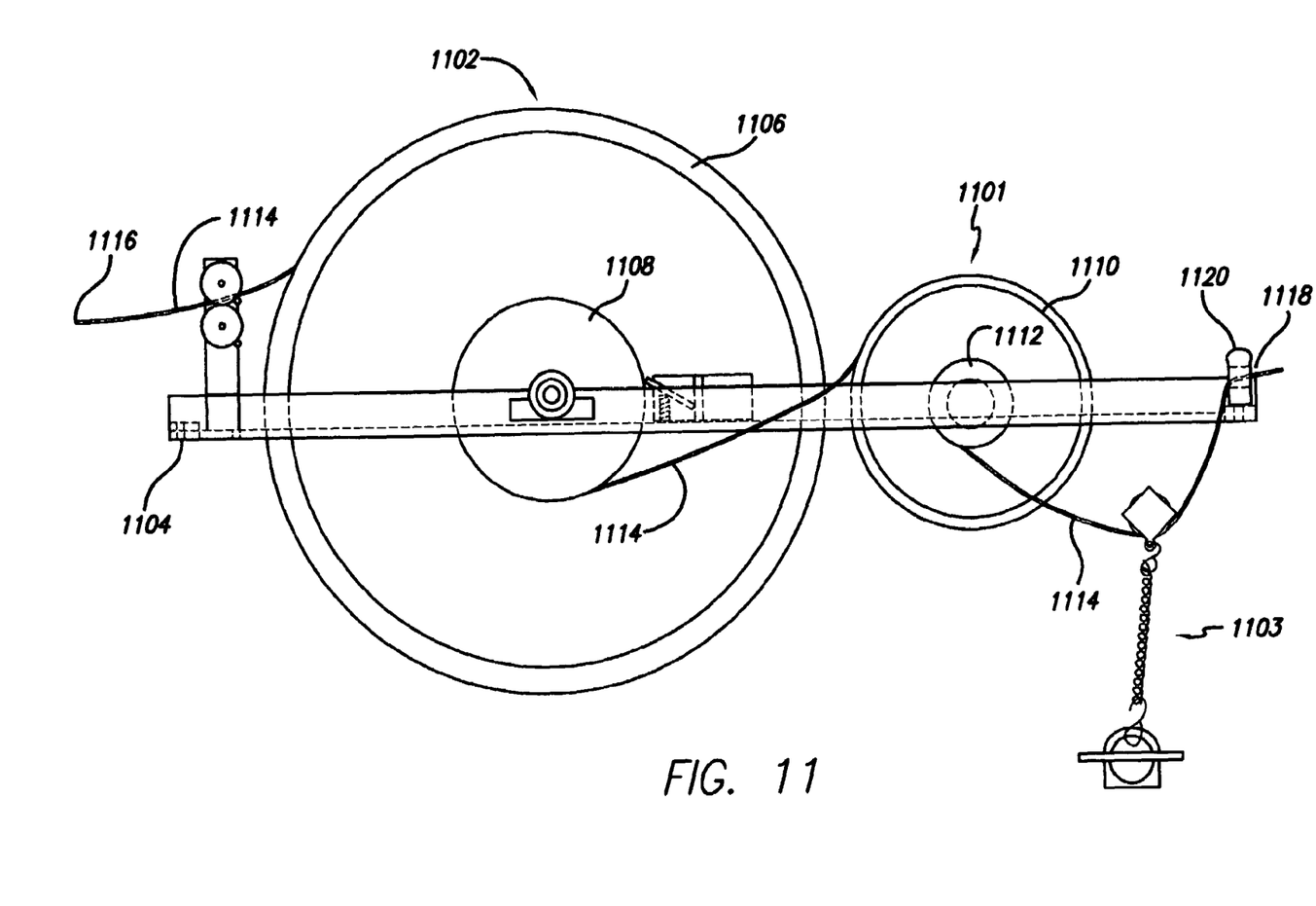

Referring to FIG. 11, an embodiment for the slack take-up mechanism is a second dual reel assembly 1101 comprised of a second user side reel 1110 and a second slack side reel 1112. The second dual reel assembly is analogous to the first user-side reel 1106 and first slack-side reel 1108 (collectively identified as 1102) described above. A thermocouple wire 1114 that has outer free-end 1116 and inner free-end 1118 threads going from the outer free-end 1116 to the inner free-end 1118 by being wound on the first user-side reel 1106, reverse wound on the first slack-side reel 1108 and being wound on the second user-side reel 1110 and reversed wound on the second slack-side reel 1112 and the inner free-end 1118 being secured to the frame 1120. There is a frame 1104 and power means to rotate the dual wheels to assist in facilitating rewind 1103. Examples of the power means are an elongated spring, coil spring, electric motor, hydraulic motor, compressed air motor, weights and other torque generators known to technicians in the art.

An embodiment of the slack take-up mechanism is a compression spring assemble (not illustrated.) This assembly is analogous to the extension spring assembly with the proviso that a spring is being compressed rather than extended during unwind by a user and cable is withdrawn from the mechanism.

Rewind Control Means

Optionally, there is a rewind control means. The rewind controls means performs the function of restraining the slack take-up mechanism from powering rewind until desired by the user. The rewind control means is engaged to slack-side reel directly or indirectly. Exemplary embodiments of the rewind control means are a pawl and ratchet, locking pin assembly, clutch assembly, brake assembly and other motion control systems known to technicians in the art. Referring to FIG. 1, a preferred rewind control means is ratchet assembly 500 comprised a pawl 504, teeth at the perimeter of the sidewall 210 of the slack-side reel, a spring 506 and release pin 508.

Fenders

Figure 6:
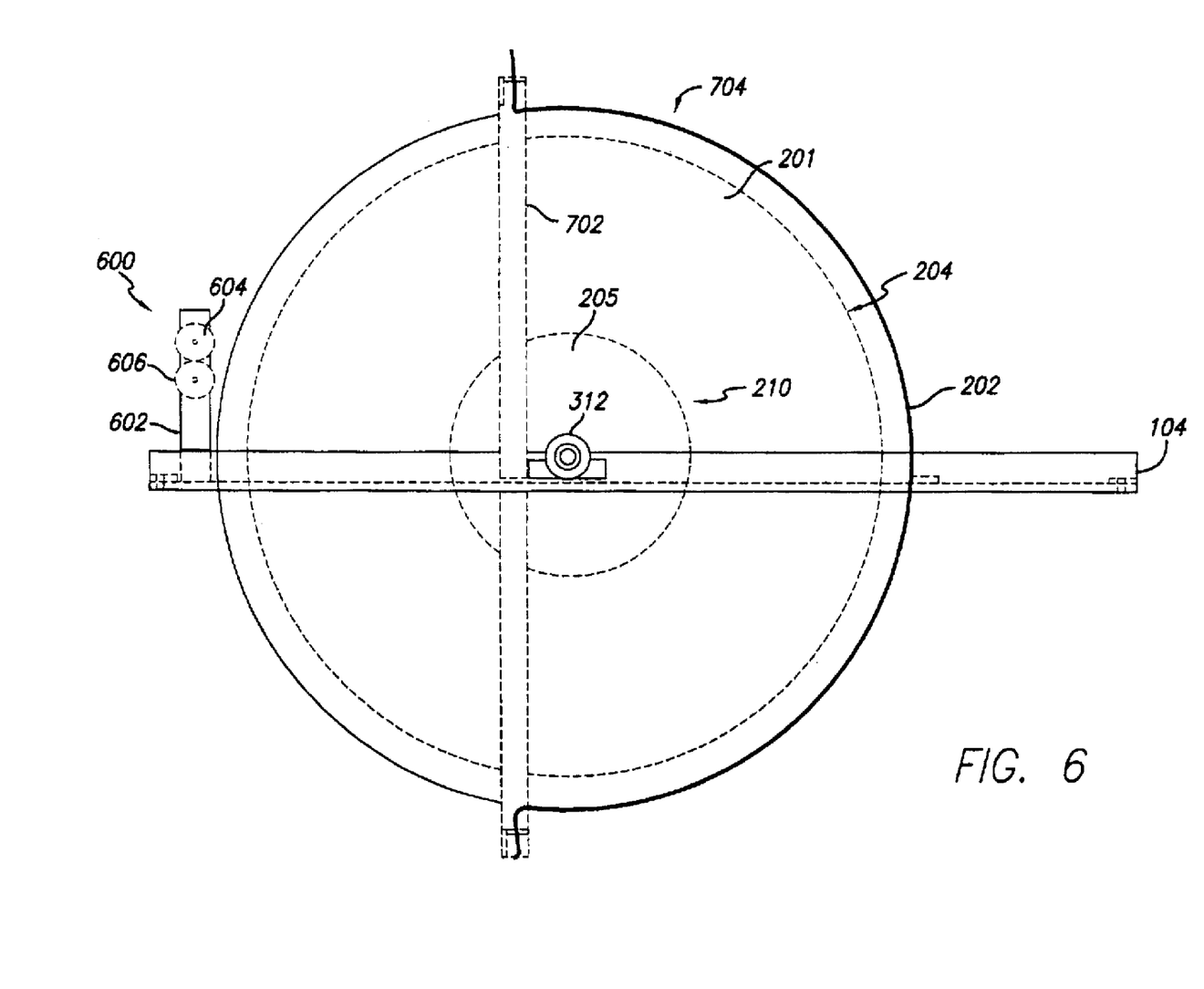
FIG. 6 shows a side view of several of the structures that make up an embodiment of the present invention and illustrates a fender and wire guide.
Figure 7:
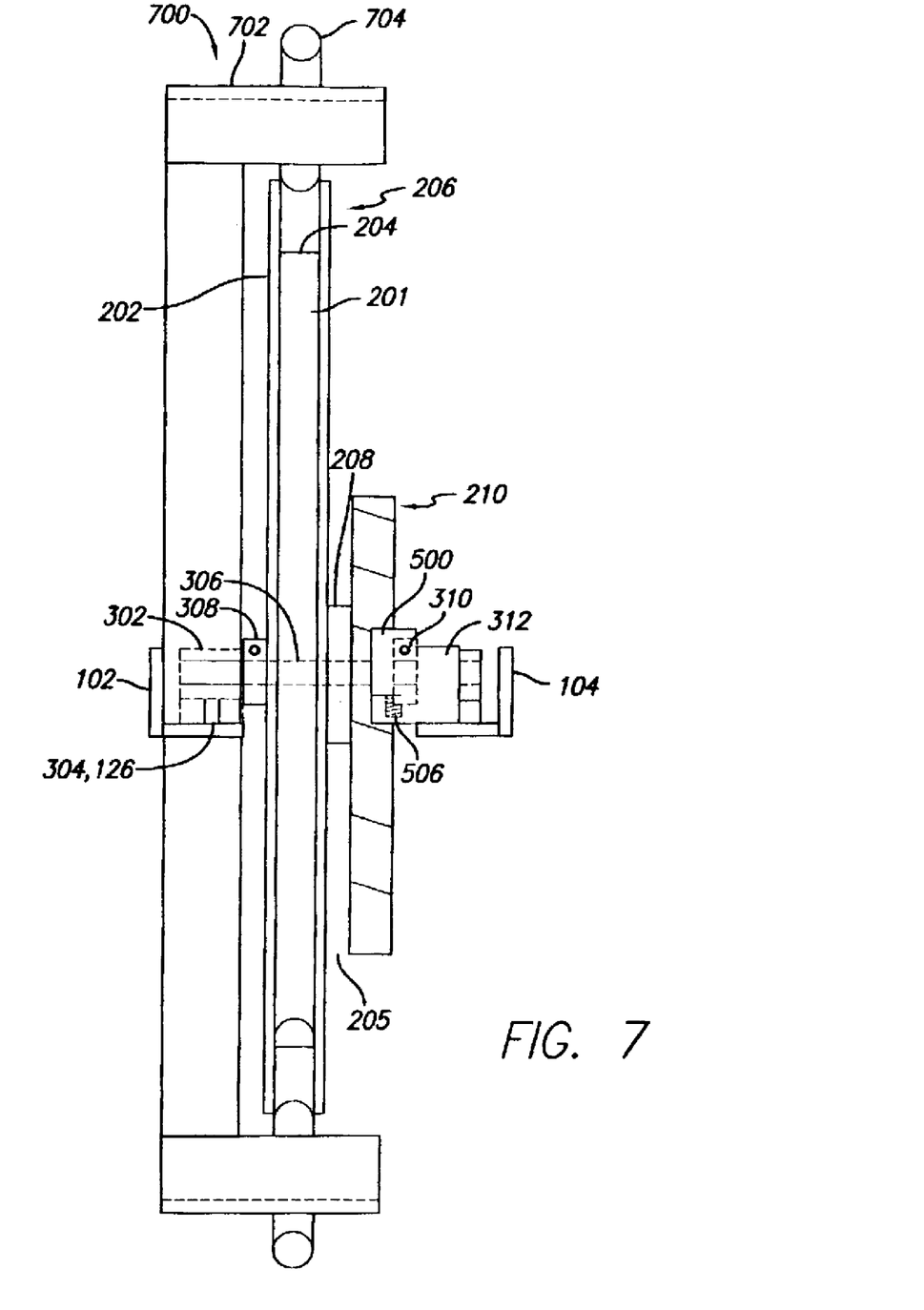
FIG. 7 shows a front view of several of the structures that make up an embodiment of the present invention and illustrates a fender and ratchet.

Referring to FIGS. 6 and 7, optionally, there are one or more fender assemblies 700 comprised of a mounting bracket 702 and a fender 704 & 706. The fender functions to restrict the heavy gauge cable from jumping out the cavity of a reel. Jumping out especially occurs at instances of jerk, yank or speed change. Referring to FIG. 6, the fender 704 can be a covering about the periphery of the reel. Referring to FIG. 7, the fender 704 can have a surface that extends into the cavity of the reel. The fenders are made from metal or plastic.

Wire Guide

Figure 5:
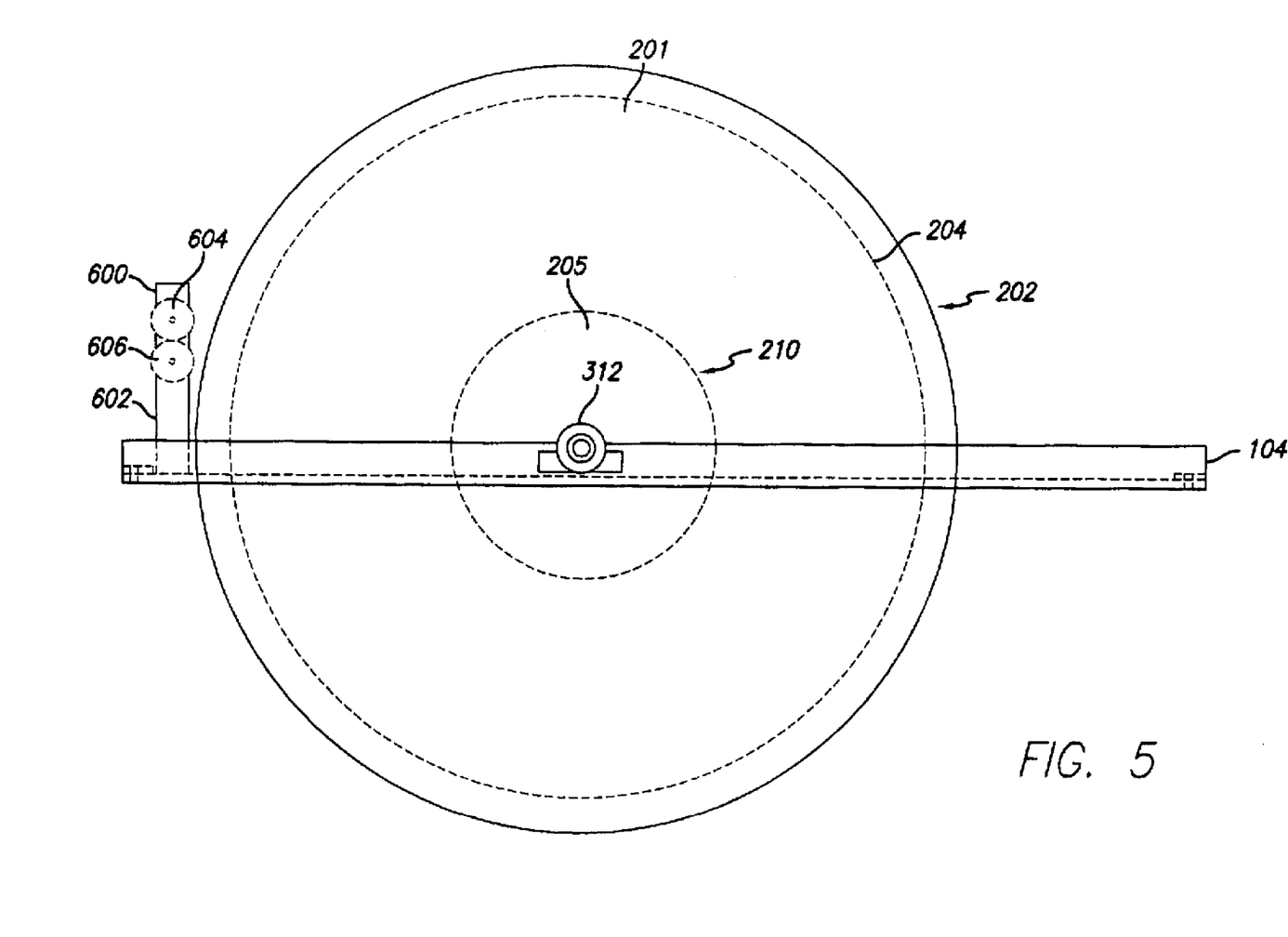
FIG. 5 shows a side view of several of the structures that make up an embodiment of the present invention and illustrates a wire guide.

Referring to FIGS. 5, optionally, there is a wire guide assemblies 600 positioned adjacent to the periphery of a reel to direct the unwinding and rewinding of heavy gauge cable on or off the reel. An exemplary configuration of a wire guide assembly 600 is a pair of oppositely opposed or spaced apart wire guide rollers 604, 606 that are dimensioned such that heavy gauge is threadable through the pair rollers. The pair of wire guide rollers 604, 606 are mounted on a bracket 602 which is attached to the frame by a screw fastened into hole 124. In a preferred embodiment, O rings are seated around the perimeter of guide roller to enhance friction.

Figure 8:
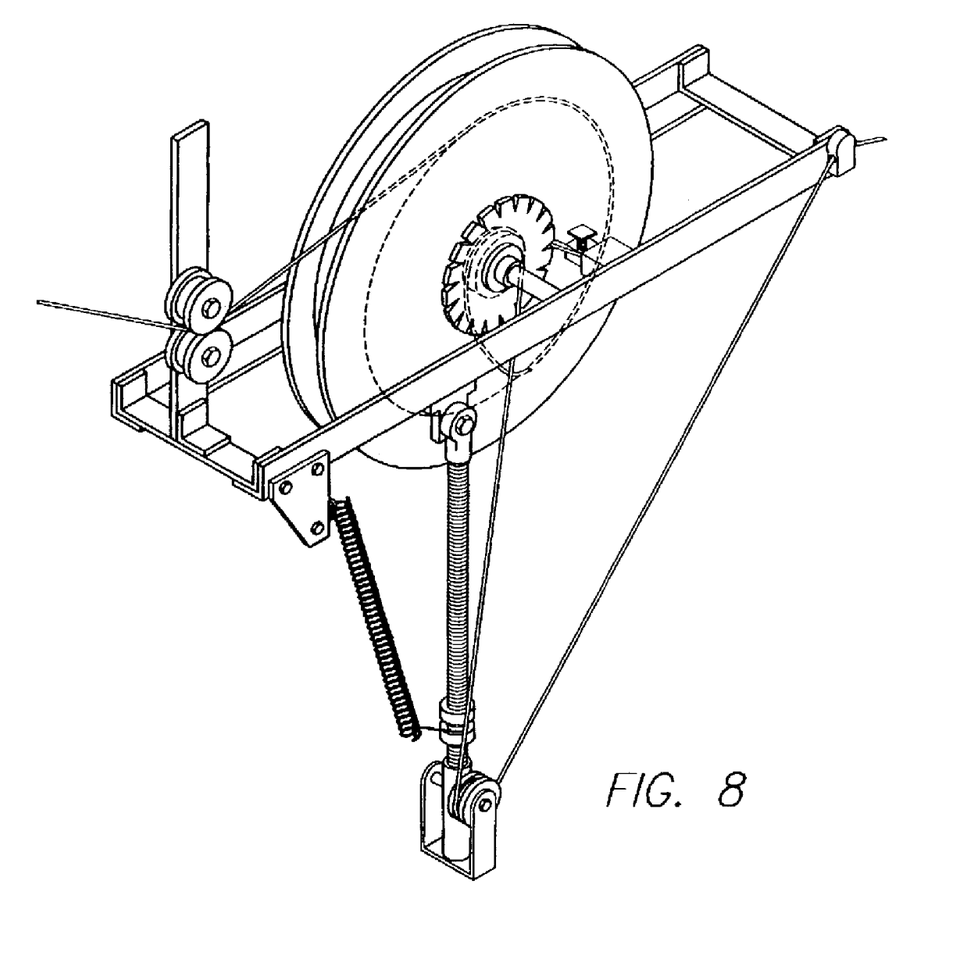
FIG. 8 is a perspective view of an embodiment of the present invention illustrating the threading of heavy gauge cable about the user side reel, slack-side reel and power pivotal arm.

Threading Referring to FIG. 8, heavy gauge cable is threaded as follows. Typically, cable is wound counterclockwise (i.e., a left handed coil) on the user-side reel. The outer free-end of the heavy gauge cable is extendable and retractable by the user. The inner free-end extends through the channel in the user-side reel hub, through the passage in the sidewall of the slack-side and into the cavity of slack-side-side reel. On the slack-side-side reel, cable is wound clockwise (i.e., right handed coil.) The outer free-end of the cable from slack-side-side reel passes across or through the slack take-up mechanism. The free end is typically secured to the frame.

Although less preferred, the cable can be threaded in a vice verse fashion. That is clockwise (left hand coil) on the user-side reel and counterclockwise (right hand coil) on the slack-side reel.

Operation

Figure 9A:
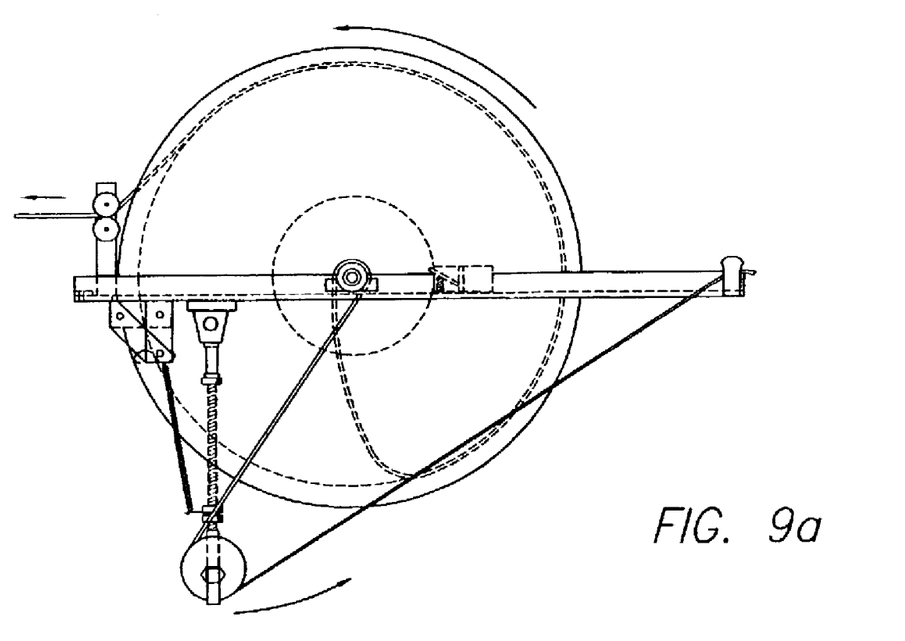
FIGS. 9a to 9e are a series of drawings illustrating the operation of an embodiment of the present invention.
Figure 9B:
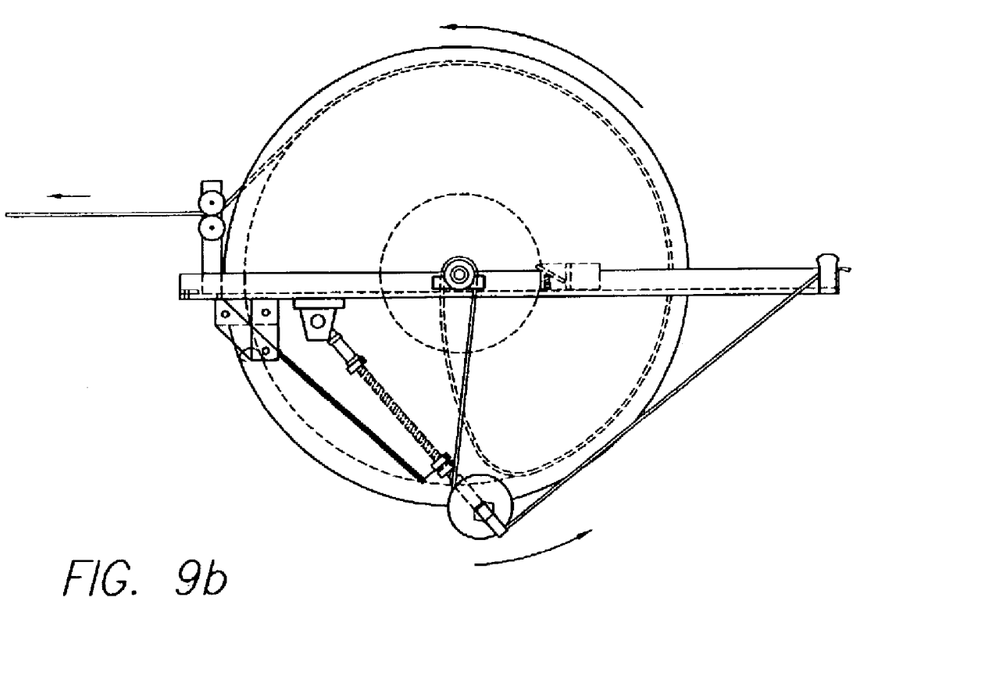
Figure 9C:
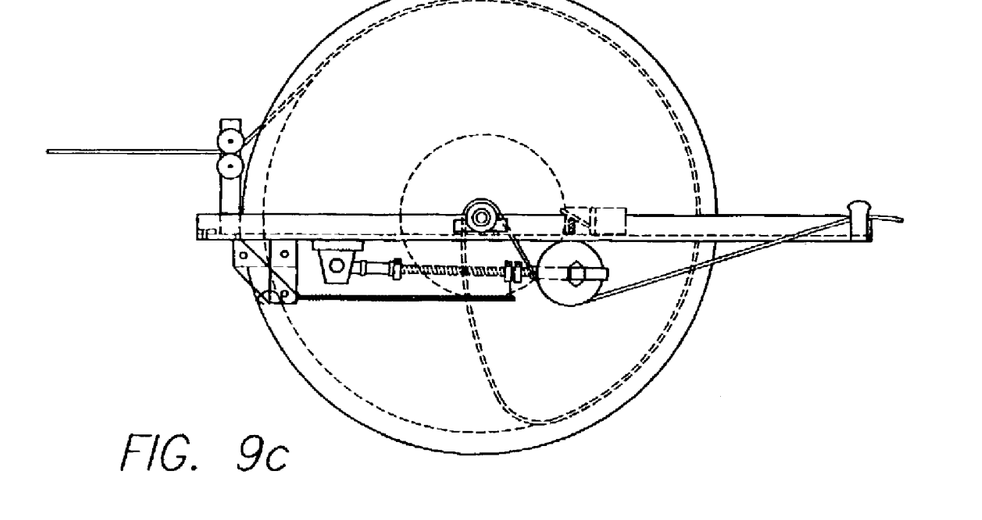

The heavy gauge cable unwinder/rewinder operates in the following manner. A user unwinds heavy gauge cable from the user-side reel by pulling on the cable. At the same time, the slack-side reel spins to wind heavy gauge cable onto itself. The heavy gauge that is being wound unto to the slack-side reel is withdrawn from the slack take-up mechanism. Referring to FIGS. 9a to 9c, if the slack take-up mechanism is a power pivotal arm, the foregoing is accomplished by the power pivotal arm being pulled up to a position proximal to the frame.

Figure 9D:
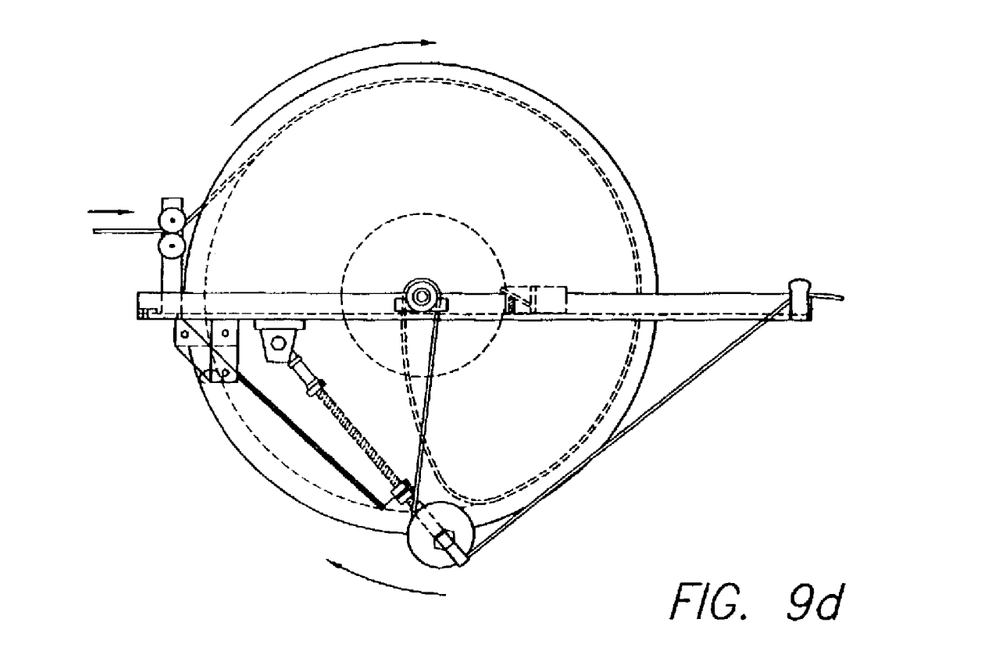
Figure 9E:
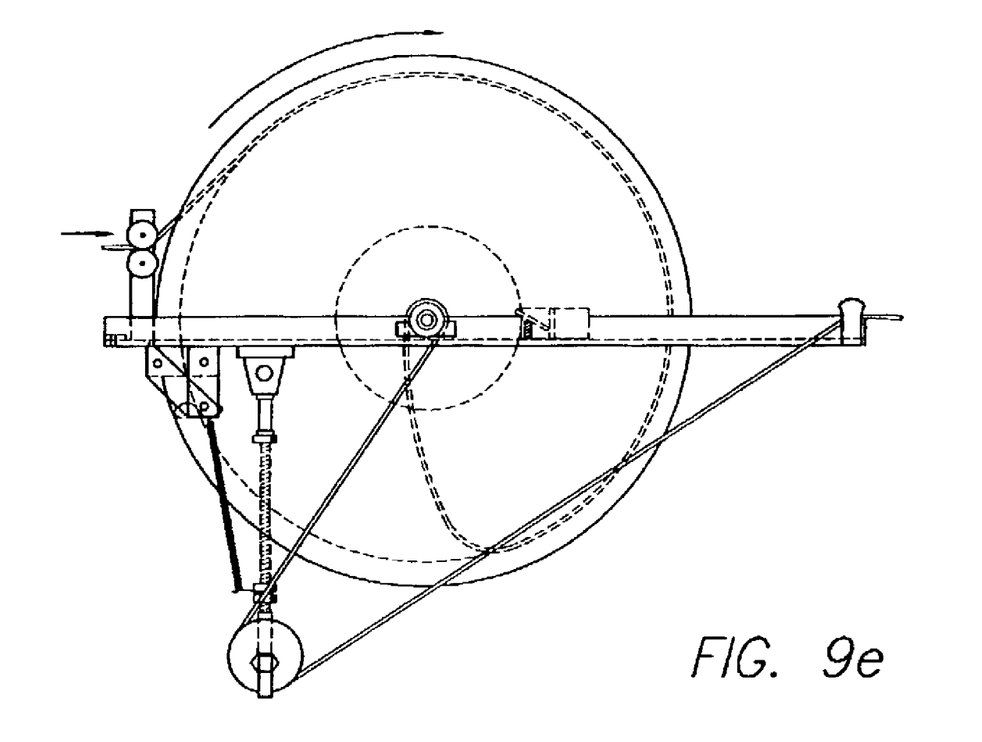

When a user desires rewind of the user-side cable, a rewind control-means is actuated, e.g., a ratchet is released, or if no such means, then tension from pulling the user-side heavy gauge cable is taken off the user-side heavy gauge cable. At this point, the slack take-up mechanism powers rewind and takes-up slack cable coming off the slack-side reel. Referring to FIGS. 9d and 9e, if the slack take-up mechanism is a power pivotal arm, the power pivotal arm swings away from the frame, inter alia, due to the power means of the power pivotal arm. This results in a pulling of the cable and rotation off the reels.

Where the power pivotal arm is a spring-loaded arm, as the spring-loaded arm swings away from the frame, tension on the spring relaxes facilitating a smooth stop to the arm.

Several unwinders/rewinders are suitable for use in tandem to handle numerous cables.

Advantages

The unwinder/rewinder of the present invention has many advantages over devices in the prior art. The advantages of the present invention include a device that is both a winder and rewinder; a device that provides for the continuous transmission of a signal (i.e., no interruption and low noise (brushless)); a device that is free from toxic substances (e.g., mercury) so as to be suitable for the pharmaceutical industry; a device having a capability of winding and unwinding thick gauge cable; a device capable of winding and unwinding up to about 25 feet of cable (the device can be outfitted with longer lengths); a device that is stationary and fixed in position; a device that does not waste or minimizes the waste of expensive cable; a device that is tolerant towards jerks and a device that winds and unwinds cable without twisting or tangling the cable in devices according to the present invention, the slack take-up mechanism alleviates the bunching up or collecting of heavy gauge cable in a chamber or area. It also alleviates the forming of loose coils within the cavity of a reel. The foregoing is unsatisfactory and not feasible for an unwinder/rewinder for use with heavy gauge cable. It subjects the unwinder/rewinder to jamming due to slack-side cable, becoming twisted, entangled and/or knotted. It also creates a resistance to rewind. This is because, heavy gauge cable is stiff and resilient.

EXAMPLE

The following example further describes and demonstrate embodiments within the scope of the present invention. The example is given solely for the purpose of illustration and is not to be construed as limitations or restrictions of the present invention, as persons skilled in the art will quickly realize many variations thereof are possible that are all within the spirit and scope of the invention.

The following example is a mock up intended to simulate conditions of connecting a thermocouple in an autoclave to a Kaye® Datalogger/recorder positioned about 25 feet from the autoclave.

A rectangular frame was constructed as follows. A pair of major runners were fashioned by cutting ¾ inch aluminum angle bracket into 28 inch lengths. A pair of minor runners were fashioned by cutting ¾ inch aluminum angle bracket into 2¾ inch lengths. At about each of the ends of each of the runners, screw holes were drilled into the runners in mating positions. Subsequently, the frame runners were fastened together using standard machine screws.

A user-side reel and slack-side reel with a common intermediate sidewall was constructed as follows. Circular sidewalls were cut out of 1/16 inch acrylic sheet. The diameter of the first side-wall and intermediate side wall was 18 inches. The third side-wall had an 8 inch diameter. Teeth were cut into the perimeter of this third side-wall. A first and second circular hub were cut from ⅜ inch acrylic sheeting. The diameters of the first and second hubs were 16 inches and 1.5 inches, respectively. A radial channel with a slight arc was routed into the first hub running from the periphery to about the through bore. A ⅜ inch through bore was drilled at the center of all these components. In a square pattern around this through bore, four screw holes were drilled into the hub. The components were fastened together with screws in the following order: first side-wall, first hub, intermediate side-wall, second hub and third side-wall.

The above described assembly of an user-side reel and slack-side reel was mounted to the frame via an axle assembly. The axle assembly was constructed as follows. A pair of ½ inch wide pillows blocks were provided, having a socket for receiving a ⅜ diameter stainless steel shaft. Into the socket of one of the pillow blocks, a ⅜ diameter shaft approximately 2¾ inches long was inserted. A stainless steel collar having a ⅜ inch inside diameter was slid unto the shaft into a position adjacent to the pillow block and fixed in position by tightening a set screw. The assembly of the user-side reel and slack side reel was slid onto the shaft and buttressed against the collar. A second stainless steel collar having a ⅜ inch inside diameter was slid unto the shaft and positioned adjacent to the sidewall of the slack-side reel. The remaining end of the shaft extending beyond this collar was inserted into the socket of the second pillow block. The axle assembly was screwed to the frame.

A spring loaded arm was constructed as follows. A pillow block was screwed to the major runner of the frame. A clevis pin was fixedly inserted into the socket of the pillow block. An 18 inch threaded shaft was screwed into the clevis pin. A collar was screwed onto the threaded shaft into a locking position with the clevis pin. A pair of collars with an S clip between the collars were screwed unto the threaded shaft about 1 inch from the end of the threaded shaft. At the end of the shaft, a clevis pin was screwed unto the distal end of the threaded shaft. Mounted to this clevis pin was a guide wheel and fender. The guide wheel was about 9 inches from the frame when the arm was in a position making a right angle with the frame. A bracket for supporting a spring was screwed to the major runner of the frame. An S-Clip was attached to the bracket. To this S-Clip a spring was attached. The other end of the spring was attached to the S-Clip on the pivotal arm.

A ratchet assembly was constructed as follows: A support bracket was screwed to the frame at a position such that the bracket extended to about the periphery of the teethed sidewall of slack-side-side reel. A lever mounted pawl was spring urged against the teeth of the sidewall of the slack-side reel with a release pin. Fenders were mounted to frame adjacent to the perimeter of the reels.

Although the present invention has been described in considerable detail with reference to certain preferred versions thereof, other versions are possible with substituted, varied and/or modified materials and steps are employed. For example, a wire connector can be used at the passage between the cavity of the user side reel to the cavity of the slack-side reel. These other versions do not depart from the invention. Therefore, the spirit and scope of the appended claims should not be limited to the description of the preferred versions contained herein.

We claim:

1. A thermocouple wire unwinder/rewinder with continuous electrical connection comprised of:
   a. a frame;
   b. a first user-side reel rotatably mounted on the frame;
   c. a first slack-side reel rotatably mounted on the frame which is linked to rotate with the user-side reel;
   d. a dual reel assembly slack take-up mechanism comprised of a second user-side reel rotatably mounted on the frame and a second slack-side reel rotatably mounted on the frame which is linked to rotate with the second user side reel and
   e. a thermocouple wire that has outer free-end and inner free-end that threads going from the outer free-end to the inner free-end by being wound on the first user-side reel, reverse wound on the first slack-side reel and, then being wound on the second user-side reel in the same direction as on the first user-side reel and then reversed wound on the second slack-side reel and the inner free-end being open for an electrical connection, whereby slack unwinding from the first slack-side reel is taken up by the second user-side reel.

2. The thermocouple wire unwinder/rewinder of claim 1 where the first user-side reel has a hub; the first slack-side reel has a hub and the diameter of the hub of the first user-side reel is greater than the diameter of the hub of the first slack-side reel.

3. The thermocouple wire unwinder/rewinder of claim 1 having a wire guide adjacent to the first user-side reel to direct the unwinding and rewinding of heavy gauge cable on or off the reel.

4. The thermocouple wire unwinder/rewinder of claim 1 having a fender associated with the first user-side or first slack-side reel to restrict cable from jumping out of the cavity of the reel.

5. The thermocouple wire unwinder/rewinder of claim 1 where the inner free-end is secured to the frame.

6. A thermocouple wire unwinder/rewinder with continuous electrical connection comprised of:
   a. a frame;
   b. a first axle rotatably mounted to the frame;
   c. a first user-side reel fixedly mounted to the first axle and having a first user-side reel hub and first user-side reel cavity;

d. a first slack-side reel fixedly mounted to the first axle and having a first slack-side reel hub and first slack-side reel cavity;
e. a first passage from the first user-side reel cavity to the second slack-side reel cavity;
d. a dual reel assembly slack take-up mechanism comprised of a second axle rotatably mounted to the frame, a second user-side reel fixedly mounted to the second axle and having a second user-side reel hub and second user-side reel cavity, a second slack-side reel fixedly mounted to the second axle and having a second slack-side reel hub and a second slack-side reel cavity and a second passage from the second user-side reel cavity to the second slack-side reel cavity;
e. a power means associated with the dual reel slack take-up mechanism to rotate the reels to assist in facilitating rewind;
f. a rewind control means in association with the user-side reel and slack-side reel to restrain rewind until desired by a user and
g. a thermocouple wire that has outer free-end and inner free-end that threads going from the outer free-end to the inner free-end by winding on the first user-side reel, extending through the first passage, then reverse winding on the first slack-side reel and then winding on the second user-side reel in the same direction as on the first user-side reel and then, then extending through the second passage and reverse winding on the second slack side reel and the inner free-end being open for an electrical connection, whereby slack unwinding from the first slack-side reel is taken up by the second user-side reel.

7. The thermocouple wire unwinder/rewinder of claim 6 where the hub diameter of the first user-side reel is greater than the hub diameter of the first slack-side reel.

8. The thermocouple wire unwinder/rewinder of claim 6 having a wire guide adjacent to the first user-side reel to direct the unwinding and rewinding of heavy gauge table on or off the reel.

9. The thermocouple wire unwinder/rewinder of claim 6 having a fender associated with the first user-side or first slack-side reel to restrict cable from jumping out of the cavity of the reel.

10. The thermocouple wire unwinder/rewinder of claim 6 where the inner free-end is secured to the frame.

* * * * *